United States Patent
Iima et al.

(10) Patent No.: US 8,191,090 B2
(45) Date of Patent: May 29, 2012

(54) COMMUNICATION APPARATUS, COMMUNICATION SYSTEM, AND METHOD OF SAME

(75) Inventors: Shin Iima, Tokyo (JP); Hirofumi Kanemaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 2108 days.

(21) Appl. No.: 09/920,883

(22) Filed: Aug. 2, 2001

(65) Prior Publication Data

US 2002/0057370 A1   May 16, 2002

(30) Foreign Application Priority Data

Aug. 3, 2000  (JP) ................................ P2000-235220

(51) Int. Cl.
*H04N 7/10*  (2006.01)
(52) U.S. Cl. .................. 725/34; 725/2; 725/35; 725/40; 725/42; 725/46
(58) Field of Classification Search .................... 725/32, 725/34, 35, 2, 40, 42, 46
See application file for complete search history.

(56) References Cited

U.S. PATENT DOCUMENTS

| | | | | |
|---|---|---|---|---|
| 4,677,466 A * | 6/1987 | Lert et al. | ......................... | 725/22 |
| 4,788,682 A * | 11/1988 | Vij et al. | ....................... | 370/259 |
| 5,105,184 A * | 4/1992 | Pirani et al. | ................... | 345/629 |
| 5,136,636 A * | 8/1992 | Wegrzynowicz | ........ | 379/221.01 |
| 5,600,364 A * | 2/1997 | Hendricks et al. | ................. | 725/9 |
| 5,774,170 A * | 6/1998 | Hite et al. | ........................ | 725/34 |
| 5,809,471 A * | 9/1998 | Brodsky | ........................ | 704/275 |
| 5,838,314 A * | 11/1998 | Neel et al. | .......................... | 725/8 |
| 5,929,849 A * | 7/1999 | Kikinis | ......................... | 725/113 |
| 6,698,020 B1 * | 2/2004 | Zigmond et al. | ................. | 725/34 |
| 2002/0010927 A1 * | 1/2002 | Kim | ............................... | 725/40 |
| 2002/0138831 A1 * | 9/2002 | Wachtfogel et al. | ............ | 725/32 |

OTHER PUBLICATIONS

U.S. Appl. No. 60/176,121, filed Jan. 2000, Kim, Yeong-Taeg.*

* cited by examiner

*Primary Examiner* — Kristine Kincaid
*Assistant Examiner* — Sumaiya A Chowdhury
(74) *Attorney, Agent, or Firm* — Frommer Lawrence & Haug LLP; William S. Frommer; Thomas F. Presson

(57) ABSTRACT

A communication apparatus, a communication system, and a method of same enabling control of a mode of output of additional information such as advertisements on a user side. A program signal and an additional signal are separated from a broadcast signal received by a receiver by a filter. The program signal is stored in a program signal use memory, while the additional signal is stored in an additional signal use memory. When there is an instruction by the user for output of the additional information, a display signal is generated by using the program signal and the additional signal read from the memories, while only the program signal is read from the memory for generation of the display signal in other cases.

14 Claims, 3 Drawing Sheets

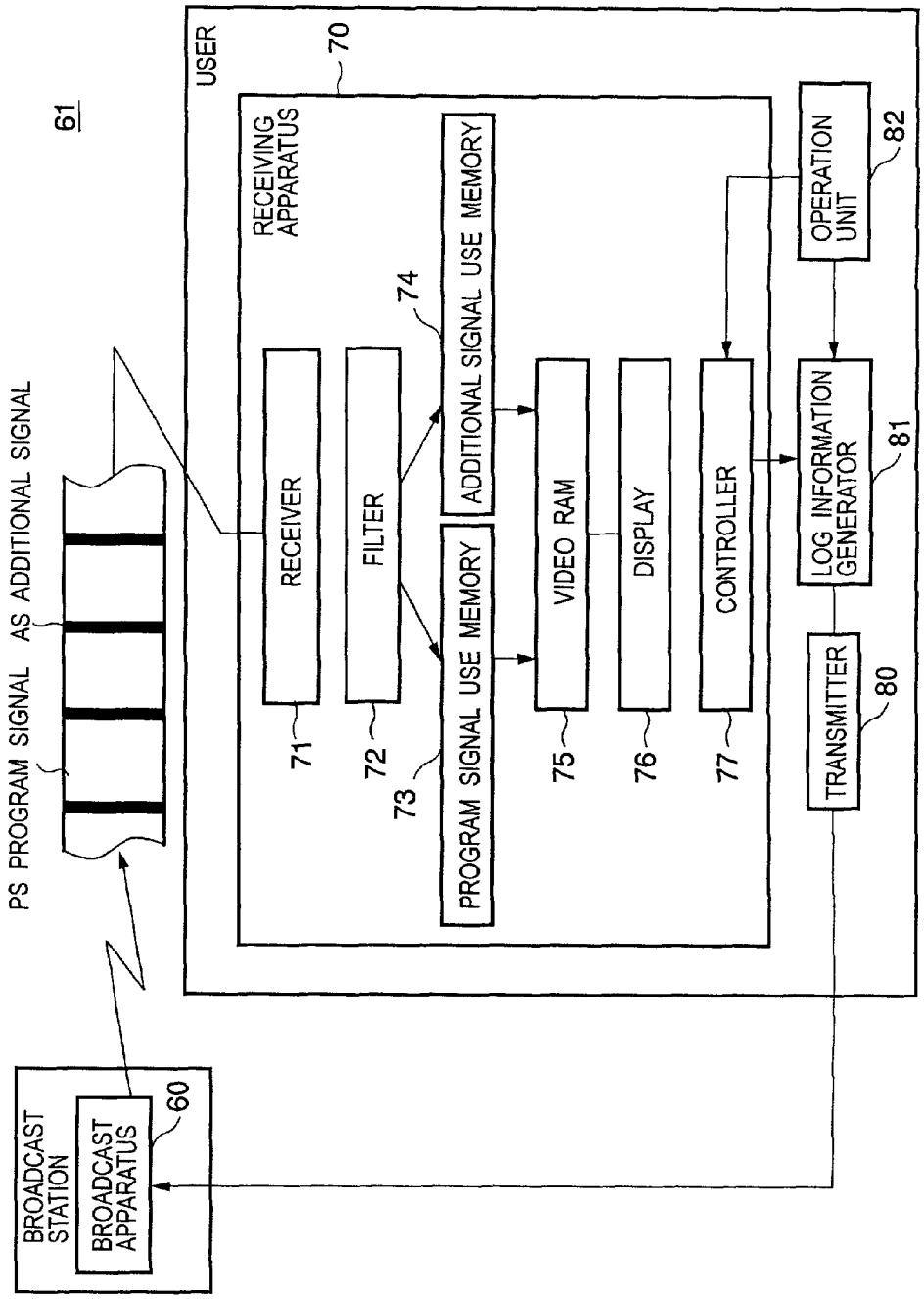

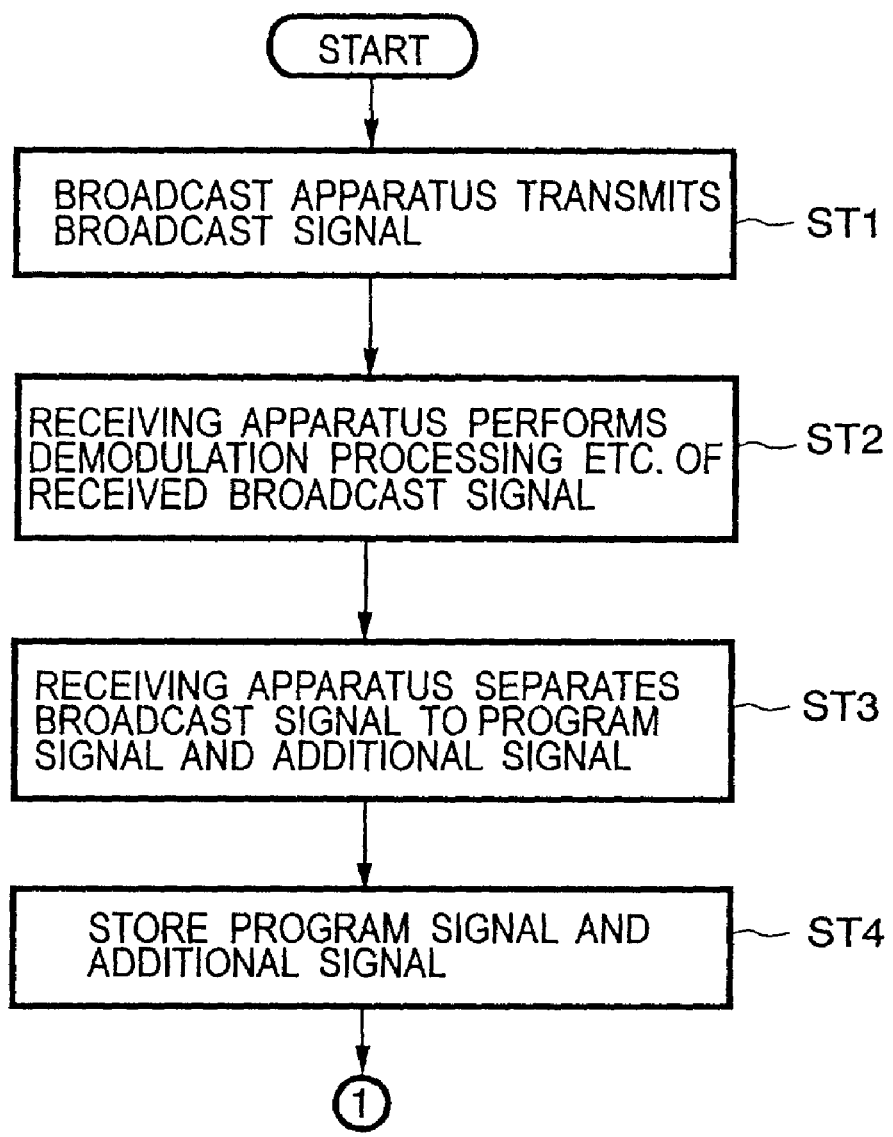

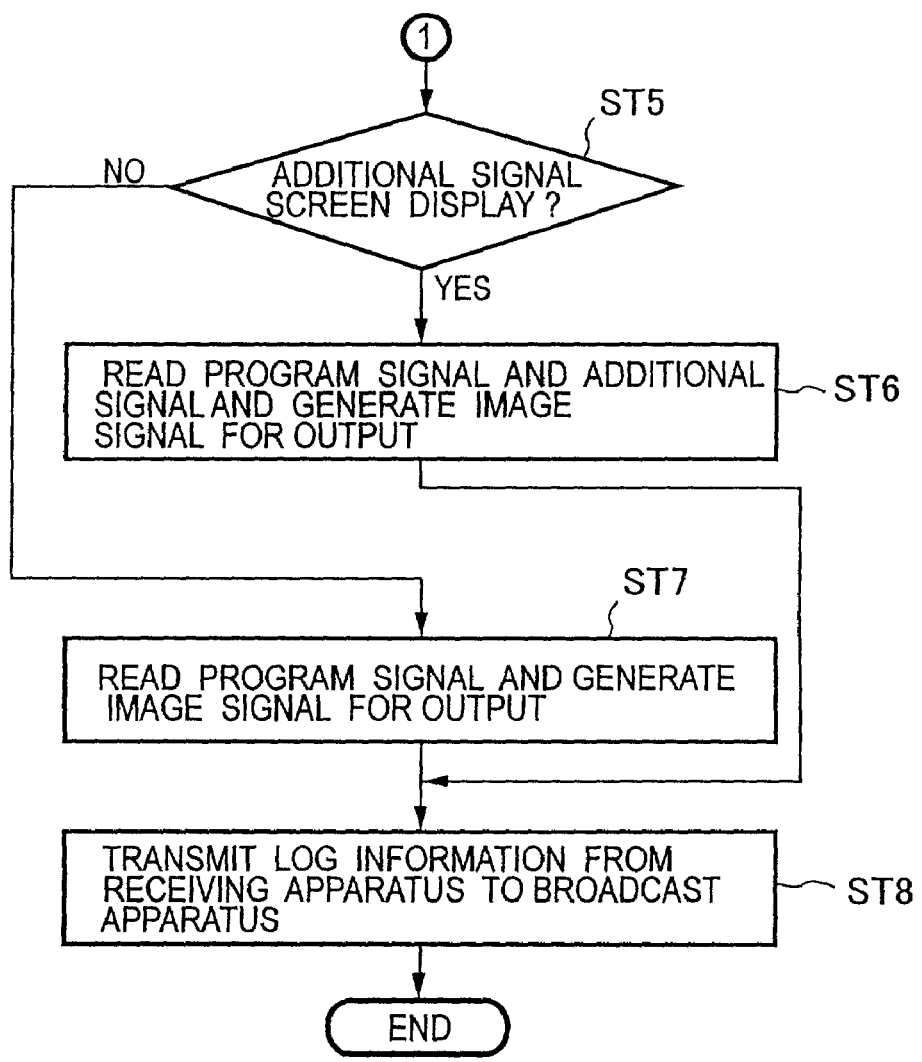

COMMUNICATION APPARATUS, COMMUNICATION SYSTEM, AND METHOD OF SAME

BACKGROUND OF THE INVENTION

1. Field of the Invention

The present invention relates to a communication apparatus capable of controlling an output format of an advertisement automatically transmitted together with a program at a reception side, a communication system, and a method of the same.

2. Description of the Related Art

At the present time, in the broadcast of programs by for example television or radio, the advertisement of a company sponsoring a related program is broadcast simultaneously with the program or between programs under the control of the transmission side.

Also, when information in accordance with a request from a user is provided via the Internet or the like from a server to a terminal, sometimes a banner advertisement or the like is automatically inserted at part of the screen displaying the information requested by the user regardless of the wishes of the user.

In the conventional method of advertisement mentioned above, however, the advertisement is provided from the transmission side to the reception side regardless of the preferences and wishes of the user, so sometimes the user receives a large number of advertisements in which it is not interested. There is the problem that this bothers the user.

SUMMARY OF THE INVENTION

An object of the present invention is to provide a communication apparatus, a communication system, and a method of same enabling control of the type of output of additional information such as advertisements on the user side receiving the advertisements.

In order to achieve the above object, according to a first aspect of the present invention, there is provided a communication apparatus comprising a receiving means for receiving a signal comprised of a mix of a program signal and an additional signal, a separating means for separating the program signal and the additional signal from the received signal, a determining means for determining whether or not to output in accordance with the additional signal, an output signal generating means for generating the output signal by using the separated program signal and additional signal when it is decided to output in accordance with the additional signal and for generating the output signal by using the separated program signal where it is determined not to output in accordance with the additional signal, and an outputting means for outputting information in accordance with the generated output signal.

The mode of operation of the communication apparatus of the first aspect of the present invention is as follows.

The receiving means receives a signal comprised of a mix of a program signal and an additional signal.

The determining means decides whether or not to output in accordance with the additional signal.

The separating means separates the program signal and the additional signal from the received signal.

Next, the output signal generating means generates an output signal using the separated program signal and the additional signal when it is decided to output in accordance with the additional signal and generates an output signal using the separated program signal when it is decided not to output in accordance with the additional signal.

The communication apparatus preferably further has a transmitting means for transmitting log information indicating a log of decisions whether or not to output in accordance with the additional signal to a transmitting side of the received signal.

Preferably the receiving means receives a signal comprised of a mix of a program signal and an advertisement signal.

According to a second aspect of the present invention, there is provided a communication system comprising a first communication apparatus for transmitting a signal comprised of a mix of a program signal and an additional signal and a second communication apparatus for receiving a signal transmitted by the first communication apparatus, the second communication apparatus comprising: a receiving means for receiving the signal transmitted by the first communication apparatus, a separating means for separating the program signal and the additional signal from the received signal, a determining means for deciding whether or not to output in accordance with the additional signal, an output signal generating means for generating an output signal by using the separated program signal and the additional signal when it is decided to output in accordance with the additional signal and generating an output signal by using the separated program signal where it is decided not to output in accordance with the additional signal, and an outputting means for outputting information in accordance with the generated output signal.

Preferably, the communication system further has a transmitting means for transmitting log information indicating a log of decisions of whether or not to output in accordance with the additional signal to the transmitting side of the received signal and the first communication apparatus charges the user of the first communication apparatus based on the log information received from the second communication apparatus.

Preferably, the first communication apparatus transmits a signal comprised of a mix of a program signal and an advertisement signal and performs processing for reducing a fee charged to the user of the second communication apparatus for transmission of the program signal when the advertisement signal was output in the second communication apparatus based on the log information received from the second communication apparatus.

Preferably, the first communication apparatus performs processing for reducing the fee charged to the user of the second communication apparatus for transmission of the program signal when the additional signal was output in the second communication apparatus based on the log information received from the second communication apparatus.

Preferably, the first communication apparatus charges the user of the second communication apparatus according to a condition determined in advance.

Preferably, the first communication apparatus transmits a signal comprised of a mix of a program signal and an advertisement signal.

According to a third aspect of the present invention, there is provided a communication apparatus comprising: an operating means operated by a user, a transmitting means for issuing a request instructing the transmission of an additional signal in accordance with operation of the operating means by the user, a receiving means for receiving a signal comprised of a mix of a program signal and an additional signal in accordance with the request, a separating means for separating the program signal and the additional signal from the received signal, an output signal generating means for generating an output signal by using the separated program signal and additional signal, and an outputting means for output information in accordance with the generated output signal.

According to a fourth aspect of the present invention, there is provided a communication method of a reception side of a signal comprising of a mix of a program signal and an additional signal, comprising the steps of: separating a program signal and an additional signal from a received signal, determining whether or not to output in accordance with the additional signal, generating an output signal by using the separated program signal and additional signal where it is decided to output in accordance with the additional signal, generating an output signal by using the separated program signal when it is decided not to output in accordance with the additional signal, and outputting information in accordance with the generated output signal.

The communication method preferably further comprises the steps of transmitting log information indicating a log of decision of whether or not to output in accordance with the additional signal from the reception side to the transmission side and charging the reception side user based on the log information on the transmission side.

The communication method preferably further comprises the steps of transmitting a signal comprised of a mix of a program signal and advertisement signal therein from the transmission side to the reception side and has the transmission side performing processing for reducing a fee charged to the reception side user for transmission of the program signal where the advertisement signal is output on the reception side based on the log information received from the reception side.

The communication method is preferably further comprised of a step of processing for increasing the fee charged to the reception side user for transmission of the program signal on the transmission side when the additional signal is output on the reception side based on the log information received from the reception side.

BRIEF DESCRIPTION OF THE DRAWINGS

These and other objects and features of the present invention will be more apparent from the following description given with reference to the accompanying drawings, wherein:

FIG. 1 is a view of the configuration of a communication system of a first embodiment of the present invention;

FIG. 2 is a flowchart for explaining an example of an operation of a broadcast system shown in FIG. 1; and FIG. 3 is a flowchart for explaining an example of the operation of the broadcast system shown in FIG. 1.

DESCRIPTION OF THE PREFERRED EMBODIMENTS

Below, an explanation will be made of a broadcast system according to an embodiment of the present invention.

FIG. 1 is a view for explaining a broadcast system 61 of the present embodiment.

As shown in FIG. 1, the broadcast system 61 has for example a broadcast station side broadcast apparatus 60 and a user side receiving apparatus 70, transmitter 80, log information generator 81, and operation unit 82.

Here, the embodiment of the first aspect of the invention is comprised by the receiving apparatus 70, transmitter 80, log information generator 81, and operation unit 82. The broadcast system 61 corresponds to an embodiment of the second aspect of the invention.

Also, the broadcast apparatus 60 corresponds to the first communication apparatus of the second aspect of the invention, and the receiving apparatus 70, transmitter 80, log information generator 81, and operation unit 82 correspond to the second communication apparatus of the second aspect of the invention.

[Broadcast Apparatus 60]

The broadcast apparatus 60 is a broadcast apparatus for example for a digital broadcast or streaming broadcast.

The broadcast apparatus 60 generates a broadcast signal S60 comprised of a mix of a program signal PS and an additional signal AS and broadcasts the related broadcast signal S60 to the user side receiving apparatus 70 by a wired or wireless method. In the present embodiment, the broadcast signal S60 is for example a bit stream. The related additional signal AS is for example a signal giving an explanation of the program or a signal of an advertisement.

Also, the broadcast apparatus 60 receives the log information from the user side transmitter 80 and charges the related user based on the related log information.

Specifically, the broadcast apparatus 60 determines the viewing fee charged to the related user based on the display of an image from the additional signal on the display 76 by the related user described in the received log information.

For example, the broadcast apparatus 60 performs charge processing so as to bill the user the viewing fee of a pay program minus a predetermined amount when the user displays an image from the additional signal of the advertisement on the display.

Also, the broadcast apparatus 60 performs charge processing so as to bill the user the viewing fee of a pay program plus a predetermined amount when the user displays for example an image from an additional signal providing an additional service such as an explanation in addition to the program on a display 76.

[Receiving Apparatus 70]

As shown in FIG. 1, the receiving apparatus 70 has for example a receiver 71, filter 72, program signal use memory 73, additional signal use memory 74, video RAM 75, display 76, and controller 77.

Here, the receiver 71 corresponds to the receiving means of the second and third aspects of the invention, the filter 72 corresponds to the separating means of the second and third aspects of the invention, the operation unit 82 shown in FIG. 1 corresponds to the determining means of the second and third aspects of the invention, the controller 77 corresponds to the output signal generating means of the second and third aspects of the invention, and the display 76 corresponds to the outputting means of the second and third aspects of the invention.

The receiver 71 receives the broadcast signal S60 transmitted by the broadcast apparatus 60, performs a processing such as demodulation, decoding, and error correction according to need, and then outputs the related broadcast signal to the filter 72.

The filter 72 separates the program signal PS and the additional signal AS mixed in the broadcast signal input from the receiver 71, writes the separated program signal PS in the program signal use memory 73, and writes the separated additional signal AS in the additional signal use memory 74.

The video RAM 75 stores the program signal PS read from the program signal use memory 73 and the additional signal AS read from the additional signal use memory 74 according to need as the output use image signal under the control of the controller 77.

The display 76 displays an image corresponding to the image signal read from the video RAM 75.

The display 76 displays, in addition to the image corresponding to the program signal PS, an image corresponding to the additional signal AS according to need in accordance with a display instruction of the user using the operation unit 82.

In this case, the image corresponding to the additional signal AS may be displayed simultaneously with the image corresponding to the program signal PS (inside the same window or outside the window of the program) or may be displayed in the middle of the program.

The controller 77 writes the program signal read from the program signal use memory 73 and the additional signal AS read from the additional signal use memory 74 according to need in the video RAM 75 in accordance with the display instruction by the user using the operation unit 82.

The operation unit 82 is for example a remote controller operated by the user and outputs an operation signal in accordance with an operation by the user on the controller 77.

[Transmitter 80]

The transmitter 80 transmits the log information (log) input from the log information generator 81 to the broadcast apparatus 60 by a wired or wireless method.

In the present embodiment, the transmitter 80 transmits log information via a telephone line to the broadcast apparatus 60.

[Log Information Generator 81]

The log information generator 81 generates log information giving a log of the instructions of the related display in accordance with the display instruction of the image in accordance with the additional signal by the user based on the operation signal from the operation unit 82 and the control log information from the controller 77 and outputs this to the transmitter 80.

[Operation Unit 82]

The operation unit 82 is for example a mouse, keyboard, or remote controller and is used by the user for instructing whether or not to display an image corresponding to the additional signal or indicating the format of the related display etc.

Below, an explanation will be made of an example of the operation of the broadcast system 61.

FIG. 2 is a flowchart for explaining an example of operation of the broadcast system 61 shown in FIG. 1.

Step ST1

The broadcast apparatus 60 generates a broadcast signal S60 comprised of a mix of a program signal PS and an additional signal AS and broadcasts the related broadcast signal S60 to the receiving apparatus 70 on the user side by a wired or wireless method.

Step ST2

The broadcast signal S60 is received at the receiver 71 of the receiving apparatus 70, processed for demodulation, decoding, error correction, etc. at the receiver 71, and then output to the filter 72.

Step ST3

The filter 72 of the receiving apparatus 70 separates the program signal PS and the additional signal AS mixed in the broadcast signal S60.

Step ST4

The program signal PS separated at step ST3 is written into the program signal use memory 73, while the separated additional signal AS is written into the additional signal use memory 74.

Step ST5

When an instruction indicating to display an image corresponding to the additional signal AS is output by the operation unit 82, the processing of step ST6 is executed, while the processing of step ST7 is executed in other cases.

Step ST6

Under the control of the controller 77 of the receiving apparatus 70, the program signal PS read from the program signal use memory 73 and the additional signal AS read from the additional signal use memory 74 are written into the video RAM 75 as the output use image signals.

Then, the display 76 displays an image in accordance with the program signal PS and an image in accordance with the additional signal AS.

Step ST7

Under the control of the controller 77 of the receiving apparatus 70, the program signal PS read from the program signal use memory 73 is written into the video RAM 75 as the output use image signal.

Then, the display 76 displays an image corresponding to the program signal PS, but does not display an image corresponding to the additional signal AS.

Step ST8

The log information generator 81 generates log information indicating a log of the display instructions of images corresponding to the additional signal by the user based on the operation signal from the operation unit 82 and the control log information from the controller 77 and transmits the related log information from the transmitter 80 to the broadcast apparatus 60.

Then, the broadcast apparatus 60 charges the related user based on the log information received from the transmitter 80 on the user side.

As explained above, according to the broadcast system 61, whether or not to display an image corresponding to the additional signal AS contained in the broadcast signal S60 on the display 76 can be determined by the user on the reception side. Namely, the display format of the image corresponding to the broadcast signal S60 can be determined on the reception side matching the preference of the user. For this reason, a service attractive to the user can be provided. Also, the broadcast station can provide a variety of services to the user by using an additional signal AS other than a broadcast of the program, so it becomes possible to link up a program broadcast and various businesses.

Also, according to the broadcast system 61, by reflecting the display of an image corresponding an additional signal AS by a user in the sum charged for the program service, utilization of a related service by the user can be promoted and new businesses other than the program broadcast can be created.

While the invention has been described with reference to a specific embodiment chosen for purpose of illustration, it should be apparent that numerous modifications could be made thereto by those skilled in the art without departing from the basic concept and scope of the invention.

For example, in the above embodiment, in the receiving apparatus 70 shown in FIG. 1, the case where the display of an image corresponding to the additional signal AS was selected after receiving the additional signal AS was exemplified, but it is also possible to transmit a request specifying the additional signal AS intended by the user from the transmitter 80 to the broadcast apparatus 60 in accordance with the operation of the operation unit 82 by the user and transmit an additional signal AS corresponding to the related request to the receiving apparatus 70 by the broadcast apparatus 60.

Also, in the above embodiment, the case where a broadcast signal S60 containing a program signal PS and an additional signal AS was transmitted to the receiving apparatus 70 by using the broadcast apparatus 60 was exemplified, but the present invention can also be applied to a case where for example a server connected to a network such as the Internet is used in place of the broadcast apparatus 60, and the related server provides picture and sound information to the receiving apparatus 70 in accordance with the request from the receiving apparatus 70.

Also, in the above embodiment, it is also possible to perform the charge processing by the broadcast apparatus 60 in accordance with the display of the additional signal on the user side based on for example a viewing agreement made in advance or two-way between the transmitter 80 and the receiving apparatus 70 and the broadcast apparatus 60.

Summarizing the effect of the invention, as explained above, according to the present invention, a communication apparatus, communication system, and method of same enabling control of the mode of output of the related additional signal on a reception side of the additional signal other than the program signal can be provided.

For this reason, automatic output on the reception side of a large amount of additional information of no interest to the user on the reception side can be avoided.

What is claimed is:

1. A communication apparatus comprising:
    a receiving means for receiving a signal comprised of a program signal and an additional signal;
    a separating means for separating the program signal and the additional signal from said received signal;
    a determining means for determining whether to output said additional signal;
    a log information generating means for generating log information comprising instructions corresponding to the additional signal;
    an output signal generating means for generating an output signal,
    wherein, when the determining means determines to output the additional signal, the output signal generating means generates the output signal by using said separated program signal and additional signal, and
    wherein, when the determining means determines not to output the additional signal, the output signal generating means generates the output signal by using said separated program signal only; and
    an outputting means for outputting information in accordance with said generated output signal;
    wherein determination of whether or not to output an image corresponding to the additional signal is made as a function of user preference after receiving said additional signal,
    wherein when a viewing fee is determined if a determination is made not to output the additional signal,
    wherein a viewing fee is reduced by a predetermined amount when the displayed additional signal is an advertisement and the viewing fee is increased by a predetermined amount when the displayed additional signal is an additional service,
    wherein a user of said communication apparatus is charged based on log information indicating whether or not the image corresponding to the additional signal was chosen to be output that is transmitted from said communication apparatus.

2. The communication apparatus as set forth in claim 1, further comprising a transmitting means for transmitting the log information indicating a log of decisions whether to output in accordance with said additional signal to a transmitting side of said received signal.

3. The communication apparatus as set forth in claim 1, wherein said receiving means receives a signal comprised of a program signal and an advertisement signal.

4. A communication system comprising:
    a first communication apparatus for transmitting a signal comprised of a program signal and an additional signal; and
    a second communication apparatus for receiving a signal transmitted by said first communication apparatus, said second communication apparatus comprising:
        a receiving means for receiving the signal transmitted by said first communication apparatus;
        a separating means for separating the program signal and the additional signal from said received signal;
        a determining means for deciding whether to output said additional signal;
        a log information generating means for generating log information comprising instructions corresponding to the additional signal;
        an output signal generating means for generating an output signal,
    wherein, when the determining means determines to output the additional signal, the output signal generating means generates the output signal by using said separated program signal and additional signal, and
    wherein, when the determining means determines not to output the additional signal, the output signal generating means generates the output signal by using said separated program signal only; and
    an outputting means for outputting information in accordance with said generated output signal;
    wherein determination of whether or not to output an image corresponding to the output additional signal is made as a function of user preference after receiving said additional signal,
    wherein when a viewing fee is determined if a determination is made not to output the additional signal,
    wherein a viewing fee is reduced by a predetermined amount when the displayed additional signal is an advertisement and the viewing fee is increased by a predetermined amount when the displayed additional signal is an additional service, and
    wherein a user of said communication apparatus is charged based on log information indicating whether or not the image corresponding to the additional signal was chosen to be output that is transmitted from said communication apparatus.

5. The communication system as set forth in claim 4, wherein said second communication apparatus includes a transmitting means for transmitting the log information indicating a log of decisions of whether to output in accordance with said additional signal to the transmitting side of said received signal.

6. The communication system as set forth in claim 5, wherein said first communication apparatus:
    transmits a signal comprised of a program signal and an advertisement signal; and
    performs processing for reducing a fee charged to the user of said second communication apparatus for transmission of said program signal when said advertisement signal was output in said second communication apparatus based on said log information received from said second communication apparatus.

7. A communication system as set forth in claim 5, wherein said first communication apparatus performs processing for reducing the fee charged to the user of said second communication apparatus for transmission of said program signal when said additional signal was output in said second communication apparatus based on said log information received from said second communication apparatus.

8. A communication system as set forth in claim 4, wherein said first communication apparatus charges the user of said second communication apparatus according to a condition determined in advance.

9. A communication system as set forth in claim 4, wherein said first communication apparatus transmits a signal comprised of a program signal and an advertisement signal.

10. A communication apparatus comprising:
an operating means operated by a user;
a transmitting means for issuing a request instructing the transmission of an additional signal in accordance with operation of said operating means by said user;
a receiving means for receiving a signal comprised of a program signal and an additional signal in accordance with said request;
a log information generating means for generating log information comprising instructions corresponding to the additional signal;
a separating means for separating the program signal and the additional signal from said received signal;
an output signal generating means for generating an output signal by using said separated program signal and additional signal; and
an outputting means for output information in accordance with said generated output signal;
wherein determination of whether or not to output an image corresponding to the output additional signal is made as a function of user preference after receiving said additional signal,
wherein when a viewing fee is determined if a determination is made not to output the additional signal,
wherein a viewing fee is reduced by a predetermined amount when the displayed additional signal is an advertisement and the viewing fee is increased by a predetermined amount when the displayed additional signal is an additional service, and
wherein a user of said communication apparatus is charged based on log information indicating whether or not the image corresponding to the additional signal was chosen to be output that is transmitted from said communication apparatus.

11. A communication method of a reception side of a signal comprised of a program signal and an additional signal, comprising the steps of:
separating a program signal and an additional signal from said received signal;
determining whether to output in accordance with said additional signal,
wherein determination of whether or not to output an image corresponding to the output additional signal is made as a function of user preference after receiving said additional signal;
generating log information comprising instructions corresponding to the additional signal;
generating an output signal by using said separated program signal and additional signal where it, is decided to output in accordance with said additional signal;
generating an output signal by using said separated program signal when it is decided not to output in accordance with said additional signal;
outputting information in accordance with said generated output signal,
wherein when a viewing fee is determined if a determination is made not to output the additional signal;
reducing a viewing fee by a predetermined amount when the displayed additional signal is an advertisement;
increasing the viewing fee by a predetermined amount when the displayed additional signal is an additional service,
wherein a user of said communication apparatus is charged based on log information indicating whether or not the image corresponding to the additional signal was chosen to be output that is transmitted from said communication apparatus.

12. The communication method as set forth in claim 11, further comprising the steps of:
transmitting the log information from said reception side to the transmission side.

13. The communication method as set forth in claim 12, further comprising the steps of:
transmitting a signal comprised of a program signal and advertisement signal therein from said transmission side to said reception side; and
having said transmission side perform processing for reducing a fee charged to said reception side user for transmission of said program signal where said advertisement signal is output on said reception side based on said log information received from said reception side.

14. A communication method as set forth in claim 12, further comprising a step of processing for increasing the fee charged to said reception side user for transmission of said program signal on said transmission side when said additional signal is output on said reception side based on said log information received from said reception side.

* * * * *